May 26, 1964 W. J. ROZMUS 3,134,177
MAGAZINE FOR TEACHING MACHINE
Filed June 14, 1961 4 Sheets-Sheet 1

*INVENTOR.*
WALTER J. ROZMUS

BY

*Watts Edgerton Pyle & Fisher*
ATTORNEY

INVENTOR.
WALTER J. ROZMUS

May 26, 1964 W. J. ROZMUS 3,134,177
MAGAZINE FOR TEACHING MACHINE
Filed June 14, 1961 4 Sheets-Sheet 4
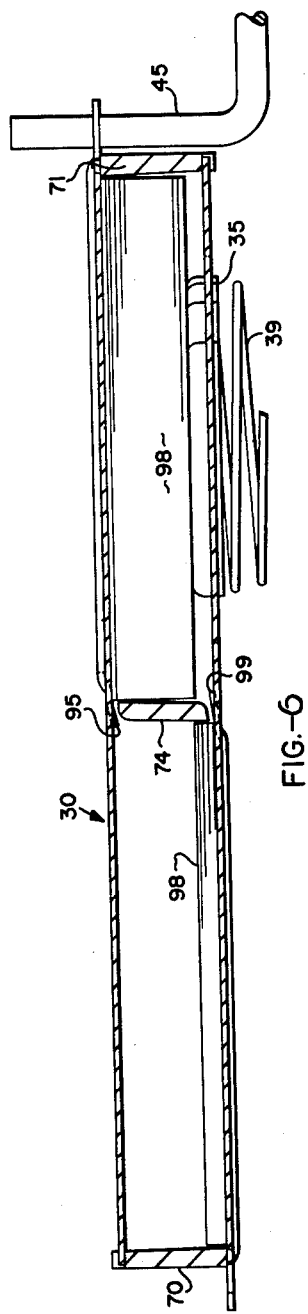
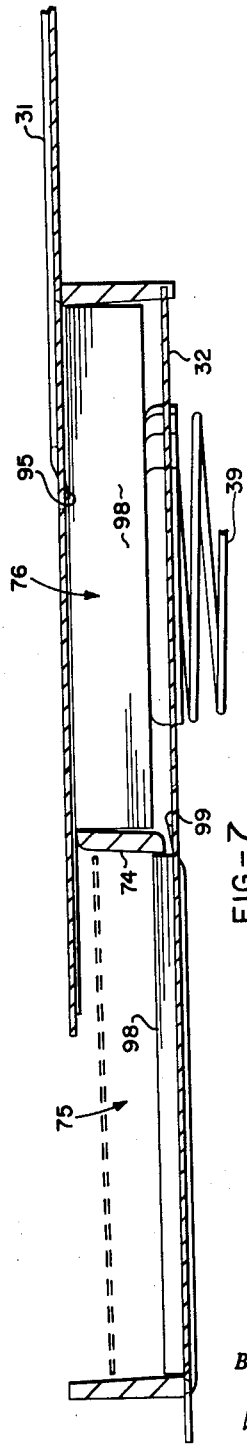
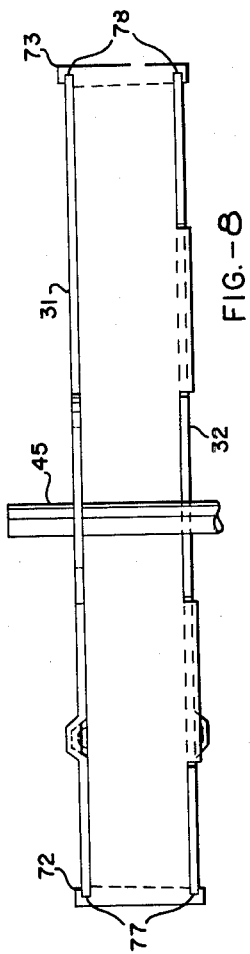
INVENTOR.
WALTER J. ROZMUS
BY
Watts Edgerton Pyle & Fisher
ATTORNEY

United States Patent Office 3,134,177
Patented May 26, 1964

3,134,177
MAGAZINE FOR TEACHING MACHINE
Walter J. Rozmus, Hubbardsville, N.Y., assignor to Hamilton Research Associates, Inc.
Filed June 14, 1961, Ser. No. 117,010
6 Claims. (Cl. 35—8)

This invention relates to educational training devices and more particularly to a magazine for that class of devices which are known as "teaching machines."

In recent years, the need for new and improved teaching aids to relieve teachers' burdens has been increasingly recognized. It has also been increasingly and more frequently recognized that mechanical teaching aids can be extremely helpful in instruction. It has, in fact, been established to the satisfaction of many educators that many, if not all, subjects can be taught with greater rapidity and facility if mechanical teaching aids are used.

The mechanical teaching aids which have been used in establishing this fact utilize what is known as the interrogatory method of teaching. That is, the student is presented with a question which he seeks to answer. He then sees the correct answer and determines whether or not his answer was correct. The student will repeat this process through a properly programmed group of questions.

Copending application for patent Serial No. 117,049, filed concurrently herewith by John William Blyth et al., is directed to an improved and simplified mechanism for teaching. With this machine, a group of question and answer cards are positioned within a housing. An answer sheet is also positioned within the housing. The question cards are indexed one at a time into a viewing position.

A numbered space for an answer, corresponding to the indexed question is simultaneously positioned at an accessible location. When the student has read the question and written in his answer in the corresponding space, he actuates an indexing mechanism which exposes the answer to the question. Simultaneously, as the answer is exposed, the answer sheet is indexed one space to shift the student's answer under a window so that the answer is not accessible to him any longer. Simultaneously, a corresponding correction space is positioned beneath a correction aperture adjacent the window. If the student has written the wrong answer in his answer space, he then writes the correct answer in the correction space. He next indexes another question into position, writes another answer, and then indexes the machine again to expose the answer to the second question. So he proceeds until he has concluded with a given group of questions.

The finished answer sheet, completed in this described manner, gives the instructor a simplified, quick, and accurate method of appraising the progress a given student is making. It also permits him to make a ready and accurate comparison of answers of students. Through this comparison, the instructor can easily determine whether or not his questions have been programmed properly.

The machine disclosed in the referenced application utilizes a novel and improved question card magazine of this application. With one such magazine positioned in the machine, cards are sequentially positioned in front of a viewing aperture in the machine one at a time. The question portion of the card is first exposed and sequentially during a second portion of an indexing cycle the answer portion of the card is exposed. When all of the cards of one group have been viewed one at a time and in sequential order, the magazine is inverted and a second group of questions, carried on the backs of the same cards, are then indexed into viewing position one at a time. The magazine and machine are sized such that most types of pictorial data such as charts, maps, pictures, and word messages, may be positioned at the viewing aperture to provide the subject matter of a given question.

Accordingly, one of the principal objects of this invention is to provide a novel and improved magazine for a teaching machine which will carry a quantity of question and answer cards and when actuated shift them, one at a time, to a viewing position and then to a storage position.

Another object of this invention is to provide a card indexing mechanism which will first expose a portion of the card, then expose a larger area, and finally index the card to a storage position and expose the smaller area of the next card to begin the cycle over.

An additional object of the invention is to provide a novel and improved magazine for a teaching machine, which magazine is reversible such that a group of question cards carried by the magazine may have both sides usable by reversing the magazine.

Other objects and a fuller understanding of the invention may be had by referring to the following description and claims taken in conjunction with the accompanying drawings in which:

FIGURE 6 is a section through the magazine card holder taken along the line 6—6 of FIGURE 4;

FIGURE 7 is a view similar to FIGURE 6 with the card actuating cover of the magazine partially through a cycle to index a card from the top of a stack; and, FIGURE 8 is an end view of the magazine taken along the line 8—8 of FIGURE 4.

Figure 1:
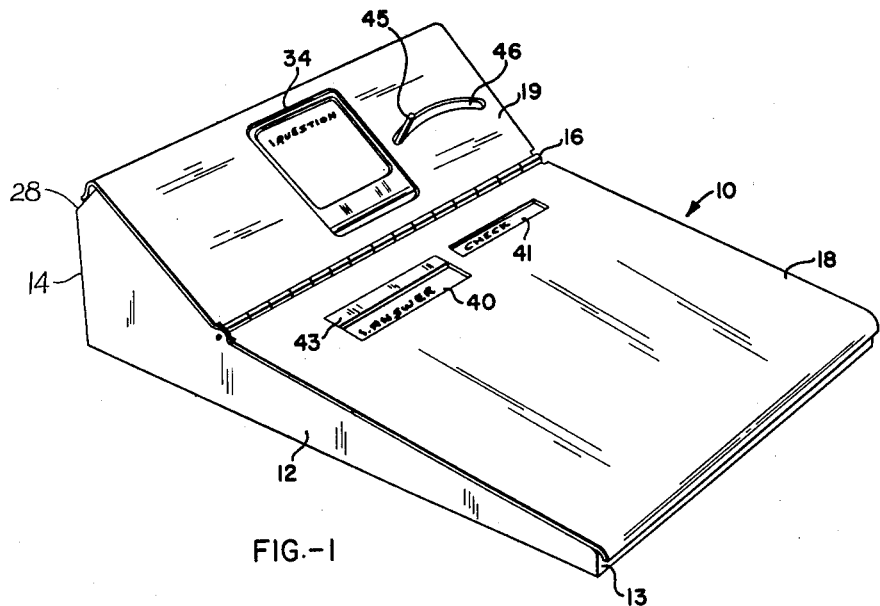
FIGURE 1 is a perspective view of a teaching machine employing the improved magazine of this invention.
Figure 2:
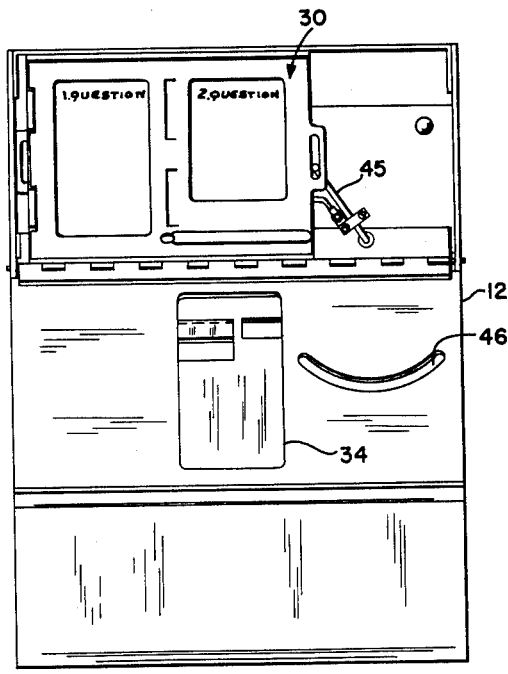
FIGURE 2 is a top plan view of the teaching machine of FIGURE 1 with the cover open to reveal the magazine unit.

Much of the description which will follow hereafter will be directed to the teaching machine per se of the companion application recited above. The purpose for this description is to make the environment for the present invention sufficiently clear to establish the usefulness of the present invention and its purpose understandable.

The teaching machine requires a progressive series of inquiries or other testing material followed by exposure of the correct response to the inquiry. For example, a question may be flashed before the student followed by the correct answer. The student then attempts to write the correct answer after the question and before the answer. He learns by this process. The problem is to present cards efficiently and rapidly in order to present such questions and answers in sequence. The present invention is directed to a magazine which will correctly expose portions of a card and then a greater part of the card in order that the inquiry may be made and then the answer exposed when both inquiry and answer are printed on one face of the same card. Furthermore, this invention is directed to the concept of making one set of cards with such printed matter on both faces and then employ the magazine to turn the stack and expose both faces in a complete series. To understand the apparatus the essence of the teaching machine will now be explained.

Referring to the drawings, a housing is shown generally at 10. The housing includes a lower wall 11, side walls 12, front wall 13 and back wall 14. A hinge 16 extends from one side wall 12 to the other. An elongated work surface and cover 18 is pivotally mounted on the hinge 16. The work surface and cover 18 extends from one side wall to the other and from the hinge 16 to the front wall 13. A magazine cover 19 is also pivotally mounted on the hinge 16. The magazine cover 19 extends upwardly and rearwardly from the hinge 16 at an angle with the work surface 18. The magazine cover 19 like the front cover 18, extends from one side 12 to the other and from the hinge 16 to the back wall 14. An opening 34 is provided to expose the magazine.

A work sheet carriage and feed structure is shown generally at 20. This structure 20 is positioned in the housing and secured to the lower wall 11. The structure 20 is positioned beneath the front cover 18. The structure 20 includes a flat sheet support and writing surface portion 21 which is positioned immediately beneath and parallel to the front cover 18.

The structure 20 also includes supporting side walls 24. A rotatable shaft 25 is journaled in the side walls 24. A pair of sheet advancing rolls 26 are secured to the shaft 25 and rotate with it. The sheet advancing rolls 26 include soft rubber surface portions which grip and advance a work sheet. The sheet structure 20 also includes a curved guide 22 which is spaced from the rolls 26 to define a sheet receiving aperture therebetween.

Although other types of mechanism for holding the card magazine cartridge of the present invention, and for presenting an answer sheet, may be employed whenever desirable, the illustrated teaching machine employs the magazine cartridge of this invention to maximum usefulness. In order to hold the magazine snug and yet make it readily removable without any fastening devices, there is provided an angular flange 29 near the hinge 16 at the forward part of the deeper housing. Opposed, and at the top part of the housing is a flat surface 28. The magazine cartridge of this invention, indicated by the reference character 30, will wedge between the surfaces. The magazine will be discussed in greater detail below.

A pad 35, mounted on shaft 36 and urged outwardly by a spring 39, is disposed in the housing beneath the viewing aperture 34. Magazine 30, as will be seen in detail hereafter, has openings on both surfaces. Hence, when the magazine is placed in the teaching machine the pad 35 may press through an opening registered over the pad and thus the cards in the magazine will be pressed forwardly by contact of the spring urged pad. This upward biasing of the cards enables the indexing of the cards one at a time from their question position to the storage position in the other compartment in the magazine.

Figure 4:
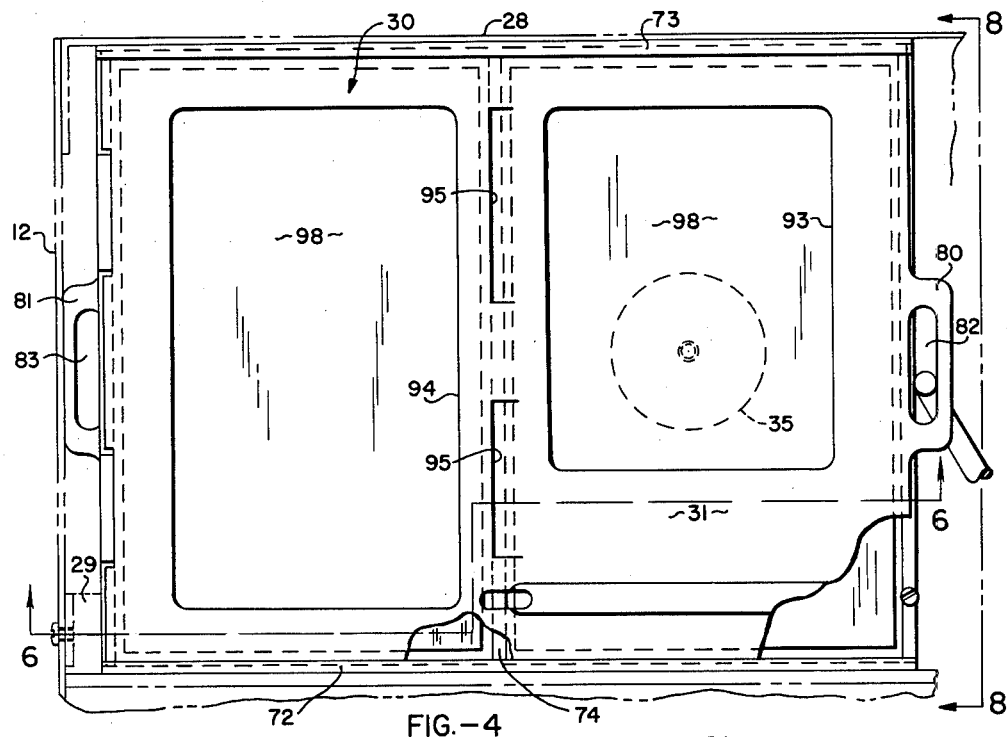
FIGURE 4 is a plan view of the magazine in a closed position.
Figure 5:
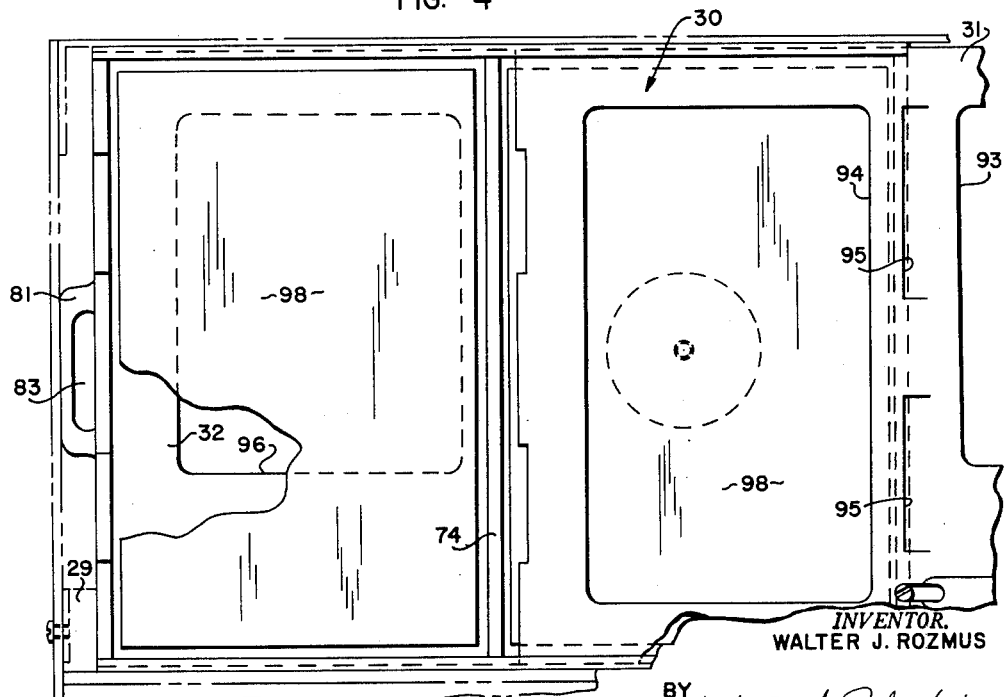
FIGURE 5 is a plan view of the magazine in an open position.

The magazine is seen in plan view in FIGURES 4 and 5, and the structure and operation is best seen in the FIGURES 6, 7 and 8. This magazine comprises, in general, a peripheral wall with a center division wall, with two slidable covers on each side of the wall. Thus, in effect, the magazine might be likened to a two-compartment box with a slidable top and bottom cover.

Structurally, the magazine indicated in the drawings by the reference character 30, is rectangular in form having spaced end walls 70 and 71 with longer side walls 72 and 73. The partition wall is indicated by reference character 74 and extends from one side wall to the other, dividing the frame into equal size chambers 75 and 76.

As the drawings indicate, parallel grooves 77 in the side wall 72, and grooves 78 in the side walls 73, provide guides for top and bottom plates 31 and 32.

At one end of each plate there is an actuation tab which has the appearance of a handle and acts as a handle in many respects. The tab on plate 31 is numbered with reference character 80, and on 32 by the character 81. These tabs 80 and 81 may be grasped manually but are actually intended for receipt of the extension part of the manual actuation handle rather than by direct personal grip. These tabs, as indicated have elongated slots 82 and 83 respectively into which the actuation handle may project.

Movement of the plate covers is limited by physical stop members, as well-known and used in such structures.

The purpose of the magazine is to shuffle cards from one compartment to the other as they are used, but to do so in a particular manner in sequence. First, the top card of a stack is only partially exposed. The part that is exposed will bear the question or other subject matter which must be analyzed by the student. A portion of the card is concealed and contains the proper response.

The cover indexing plate is then shifted to expose the entire card including the original subject matter and the response. The student may mark his response paper if correction is indicated. Then, the indexing plate cover is again shifted and moves the card over into the adjacent chamber in order to expose the next card in sequence.

Physically, according to the present invention, in order to carry out this sequence, the indexing plates 31 and 32 are provided with a combination of features which produce the indicated desired result. Referring to plate 31 as an example, this being the top plate in the plan view, it will be seen that there is a smaller aperture 93 to the right of the plate and a larger aperture 94 to the left. When used in the teaching machine the spring urged pad 35 presses upwardly from the back against the cards in the chamber on the right hand side. Note that the problem or question on the card is exposed to aperture 93, but the answer is hidden behind the metal of the cover. When the cover indexing plate 31 is shifted to the right, the aperture 94 will be positioned above the card in the chamber 76 and hence the answer on that card will be fully exposed. Now then, by placing the magazine under the cover 19 with the chamber 76 exposed through a window aperture 34 in the cover 19, the chamber 75 will be concealed. It is not essential to conceal the chamber 75 because cards shifted to this chamber have been fully examined, but such double exposing would be distracting and hence this part may be positioned under the cover. By actuating the indexing cover plate 31 to a closed position, the cards in the chamber 76 may be partially covered to expose only the problem-question portion, and thereafter fully exposed by shifting the plate 31 to the right. Then the card is shifted to the storage chamber 75 by returning the plate to the closed position.

In order to shift the cards from one compartment to another, the plates have tabs indented downwardly from the surface and act to catch upon the edge of the cards and shift them off the top of the stack to the storage area. These tabs are indicated by reference number 95 on plate 31. This type of card shifting in magazines is old and well-known and will be understood by those skilled in the art. As the plate 31 is shifted to its closed position these tabs will carry the topmost card with it and shift the card into the adjacent chamber. Because the magazine is carried at a slight angle with the horizontal end positioned in the magazine, the cards will be gravity stacked.

Thus, as this reciprocating movement is repeated, the cards one by one are shifted from one card chamber to the other and are stacked in the storage chamber in inverse order with respect to the original stacking.

The indexing plate 32 has a smaller aperture corresponding to aperture 93 of plate 31 associated with the card chamber 75 for exposing only the problem portion. Thus, the smaller aperture of plate 32 is diagonally opposite the smaller aperture 93 of plate 31. Similarly a larger aperture in plate 31, corresponding to aperture 94 communicates with the second card chamber 76 and is diagonally opposite the aperture 94. When all of the faces of one stack of cards 98 are shifted from the card chamber 76 to the card chamber 75 the entire magazine is reversed in the teaching machine. Reciprocation, once the magazine has been reversed, of the other indexing plate 32 will cause its tabs 99, to shift the cards 98 one at a time back to the card chamber 76.

In the description of the magazine 30, it will be recalled there was no spring device internally of the magazine to keep the packet of cards pressed against the viewing face. The magazine 30, when detached from the illustrated teaching machine, will allow the cards to fall back and forth freely within the compartment. However, the cards within the magazine are never fully concealed, a large opening being positioned at the rear face of any set of cards when the magazine is positioned in the machine in the place provided. Thus, when the magazine 30 is seated upon the angle support surface 29 and then pressed into holding position against the surface 28, the pad 35 will be depressed against the force of its spring and hence will provide the necessary spring urge to the stack of cards in the right hand compartment when the magazine is placed in the machine. This presses the stack of cards against the one of the magazine plates which is the top plate again in the example cited, the plate 31. This upward biasing of the cards enables the indexing of the cards one at a time from their question position to the storage position in the other compartment in the magazine.

The front cover 18 has a rectangular writing slot 40 through which a response may be written upon a paper below the cover 18. A slot 41 is provided to enable writing along another portion of the paper. Half of the slot 40 is open and the other half is closed by a transparent window 43. The slot 41 is positioned in transverse alignment with the window 43 and the two apertures are positioned side-by-side at the transverse center of the top front cover 18 near the hinge 16. An answer sheet is positioned on the answer sheet supporting structure 20.

Although the structural details of the teaching machine is set forth and described in detail in the referenced companion application, it is believed that a very short statement of its function at this time will enable better understanding of the magazine and its function.

Figure 3:
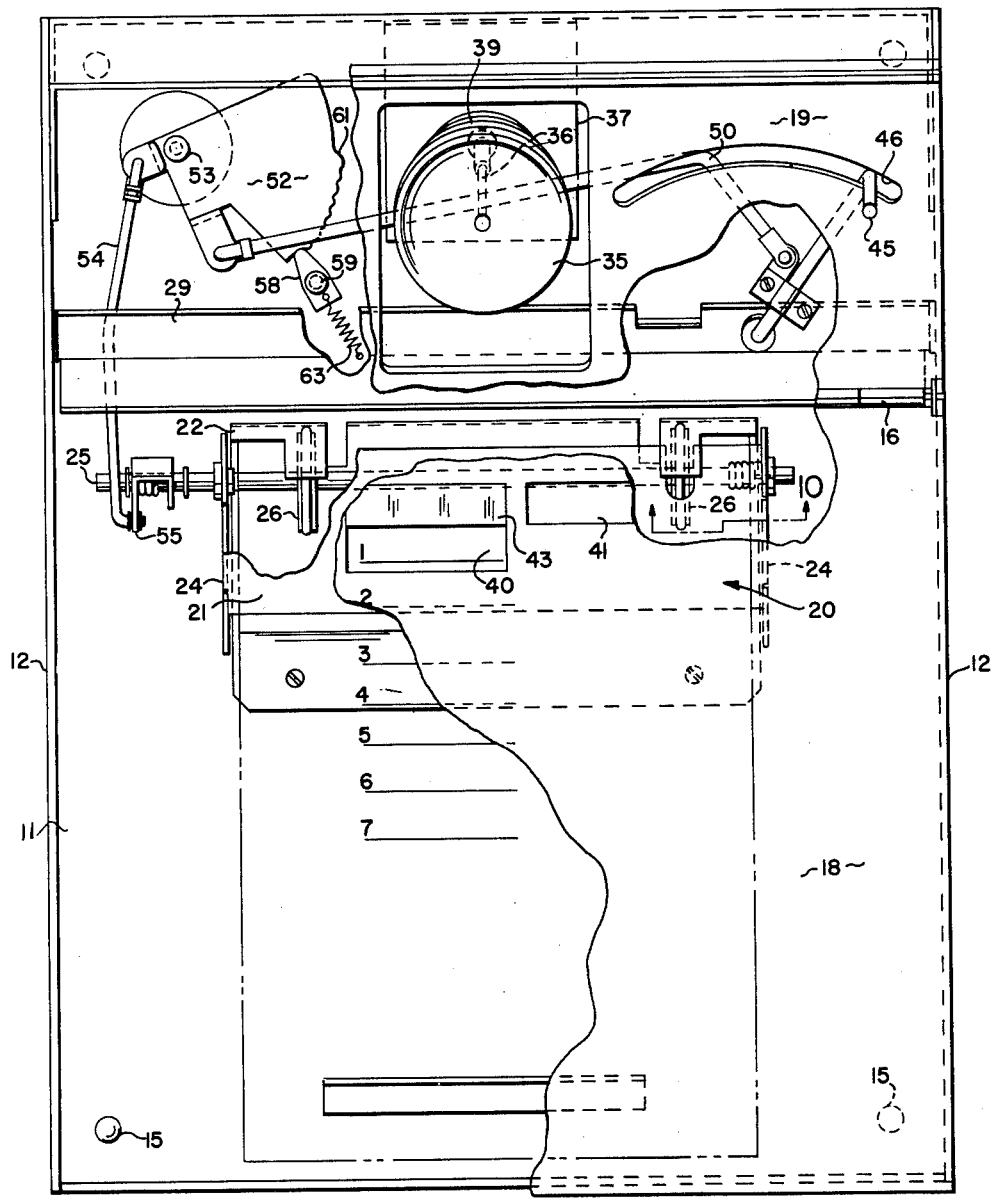
FIGURE 3 is a top plan view of the teaching machine of FIGURE 1 on an enlarged scale with parts broken away, and with the magazine of this invention removed.

The top plan view of the teaching machine shown in FIGURE 3 will indicate mechanism associated with the handle 45 operating through a motion converting detent to actuate the paper advancing mechanism 20. Note that handle 45 extends through the slots on the end of the appropriate cover of the magazine and hence will cause the magazine cover to shift at the same time the paper advancing mechanism is shifted. The paper advancing mechanism operating through a suitable one direction linkage means, will cause the paper to advance relative to the writing and viewing slots in the cover 18 whenever the handle 45 is moved to the right. Thus, a cover plate is moved to expose a larger portion of the card and hence reveal the answer to the question portion previously exposed. Thus, the answer written by the student in the answer slot will be moved up under the viewing window where it can be seen but not altered. At this time the correct response is revealed on the card and the student can compare what he wrote with what should have been written. A return of the handle 45 to the left will shift the card out of the view of the student and expose a new card.

What is claimed is:

1. A magazine for a teaching machine comprising a frame structure, walls defining the perimeter of a storage space and a partition dividing the space into first and second card storage compartments, the walls including first and second spaced and parallel sets of guides, first and second indexing plates in the first and second guides respectively and rectilinearly movable relative to the walls, each plate being movable from a first to a second position, each plate having a question aperture and a spaced question and answer aperture, the first plate when in the first position having its question aperture in communication with the first compartment and its question and answer aperture in communication with the second compartment, the first plate when in the second position having its question and answer aperture in communication with the first compartment, the second plate when in the first position having its question aperture in communication with the second compartment and its question and answer aperture in communication with the first compartment, and the second plate when in the second position having its question and answer aperture in communication with the second compartment.

2. A magazine for a teaching machine comprising, a frame structure, walls defining the perimeter of a rectangular storage space and a partition dividing the space into first and second card storage compartments of equal size, the walls including first and second spaced and parallel sets of guides each substantially normal to the partition, first and second indexing plates in the first and second guides respectively and rectilinearly movable relative to the walls, each plate being movable from a first to a second position, each plate having a question aperture and a spaced and larger question and answer aperture, the first plate when in the first position having its question aperture in communication with the first compartment and its question and answer aperture in communication with the second compartment, the first plate when in the second position having its question and answer aperture in communication with the first compartment, the second plate when in the first position having its question aperture in communication with the second compartment and its question and answer aperture in communication with the first compartment, and the second plate when in the second position having its question and answer aperture in communication with the second compartment.

3. A magazine for a teaching machine comprising, a frame structure, walls defining the perimeter of a storage space and a partition dividing the space into first and second card storage compartments, the walls including first and second spaced and parallel sets of guides, first and second indexing plates in the first and second guides respectively and rectilinearly movable relative to the walls, each plate being movable from a first to a second position, each plate having a question aperture and a spaced and larger question and answer aperture, each plate including a laterally projecting slotted tab at one end and adjacent the question aperture of its plate, the first plate when in the first position having its question aperture in communication with the first compartment and its question and answer aperture in communication with the second compartment, the first plate when in the second position having its question and answer aperture in communication with the first compartment, the second plate when in the first position having its question aperture in communication with the second compartment and its question and answer aperture in communication with the first compartment, and the second plate when in the second position having its question and answer aperture in communication with the second compartment.

4. A magazine for a teaching machine comprising a rectangular frame, a transverse partition wall dividing said frame into two equal size chambers, a slidable top cover connected to said frame for longitudinal movement, and a slidable bottom cover opposed to said top cover and connected to said frame for longitudinal movement, each of said covers having a first aperture and a spaced, relatively smaller second aperture adapted to be placed in communication with one chamber when the first aperture is in communication with the other chamber, said covers being substantially identically formed so that corresponding apertures in the covers are disposed on opposite sides of said partition.

5. The structure as claimed in claim 4 wherein each of said covers includes card-engaging means for individually shifting cards disposed in one chamber into the other chamber when said covers are moved in one direction.

6. A card magazine for a teaching machine comprising a rectangular frame having spaced end walls and side walls, a transverse partition extending between said side walls and dividing said frame into a pair of substantially equal size chambers, guide means extending along each side wall, a cover plate slidably engaged with said guide means, said plate having a relatively large opening and a spaced relatively smaller opening, said plate being movable between a first position in which said relatively large opening is in communication with one of said chambers and a second position in which said relatively smaller opening is in communication with said one chamber and said relatively larger opening is in communication with the other chamber, and card engaging means on said plate between said openings for individually shifting cards from said one chamber to said other chamber when said plate is moved from said first position to said second position.

References Cited in the file of this patent
UNITED STATES PATENTS

| | | |
|---|---|---|
| 1,877,406 | Kauffman | Sept. 13, 1932 |
| 2,169,266 | Matter | Aug. 15, 1939 |
| 2,858,628 | Rideout | Nov. 4, 1958 |